US012568544B2

(12) United States Patent (10) Patent No.: US 12,568,544 B2
Nan et al. (45) Date of Patent: Mar. 3, 2026

(54) TERMINAL TRANSMITTER STATE DETERMINATION METHOD, SYSTEM, BASE STATION AND TERMINAL

(71) Applicant: CHINA TELECOM CORPORATION LIMITED, Beijing (CN)

(72) Inventors: Fang Nan, Beijing (CN); Guiqing Liu, Beijing (CN); Xin Zhang, Beijing (CN); Jianchi Zhu, Beijing (CN); Xiaoming She, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 54 days.

(21) Appl. No.: 18/427,174

(22) Filed: Jan. 30, 2024

(65) Prior Publication Data

US 2024/0179772 A1 May 30, 2024

Related U.S. Application Data

(63) Continuation of application No. PCT/CN2023/091231, filed on Apr. 27, 2023.

(30) Foreign Application Priority Data

Apr. 28, 2022 (CN) .......................... 202210459901.1

(51) Int. Cl.
| | |
|---|---|
| *H04B 7/0413* | (2017.01) |
| *H04W 72/0453* | (2023.01) |
| *H04W 76/15* | (2018.01) |

(52) U.S. Cl.
CPC .......... *H04W 76/15* (2018.02); *H04B 7/0413* (2013.01); *H04W 72/0453* (2013.01)

(58) Field of Classification Search
CPC . H04B 7/0413; H04W 76/15; H04W 72/0453
See application file for complete search history.

(56) References Cited

U.S. PATENT DOCUMENTS

| | | | |
|---|---|---|---|
| 2019/0158137 A1 | 5/2019 | Brunel et al. | |
| 2024/0357681 A1* | 10/2024 | Rastegardoost | ........ H04W 8/22 |

FOREIGN PATENT DOCUMENTS

| | | |
|---|---|---|
| CN | 112074016 A | 12/2020 |
| CN | 114245431 A | 3/2022 |

(Continued)

OTHER PUBLICATIONS

First Office Action for CN Patent Application No. 202210459901.1 of May 11, 2024.

(Continued)

*Primary Examiner* — Rahel Guarino
(74) *Attorney, Agent, or Firm* — Perilla Knox & Hildebrandt LLP; Kenneth A. Knox

(57) ABSTRACT

The present disclosure relates to a terminal transmitter state determination method, a system, a base station and a terminal, relating to the technical field of communications. The method of the present disclosure comprises: sending transmitter state configuration information from a base station to a terminal, wherein a band on which transmitter chains of the terminal perform uplink transmission is dynamically switched among more than two bands, and the transmitter state configuration information is configured to, in a case that a selectable transmitter state of the terminal is not unique after the band on which the transmitter chains of the terminal perform the uplink transmission is switched, indicate the transmitter state of the terminal after the switching.

20 Claims, 3 Drawing Sheets

A terminal sends capability information to a base station — S202

The base station sends transmitter switching configuration information and transmitter state configuration information to the terminal — S204

The base station determines, according to the transmitter state configuration information, a transmitter state of the terminal after switching — S206

(56)                    References Cited

FOREIGN PATENT DOCUMENTS

| WO | 2020144540 | A1 | 7/2020 |
| WO | 2021077432 | A1 | 4/2021 |
| WO | 2022011543 | A1 | 1/2022 |
| WO | 2022016372 | A1 | 1/2022 |
| WO | 2022027560 | A1 | 2/2022 |

OTHER PUBLICATIONS

International Search Report for International Application No. PCT/CN2023/091231.
Remaining issues on dynamic UL Tx switching (Aug. 17-20, 2020).
R1-2310769—Introduction of UL Tx switching across up to 4 bands.
R2-2306911-RRC configuration for Rel-18 UL Tx switching enhancements.
TS38.214—3rd Generation Partnership Project;Technical Specification Group Radio Access Network;NR;Physical layer procedures for data(Release 18).
TS38.331—3rd Generation Partnership Project;Technical Specification Group Radio Access Network;NR;Radio Resource Control (RRC) protocol specification(Release 18).

* cited by examiner

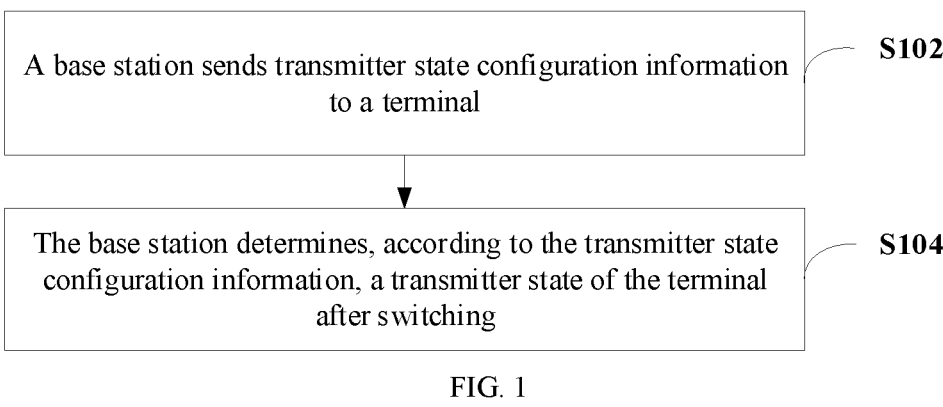

A base station sends transmitter state configuration information to a terminal — S102

The base station determines, according to the transmitter state configuration information, a transmitter state of the terminal after switching — S104

FIG. 1

A terminal sends capability information to a base station — S202

The base station sends transmitter switching configuration information and transmitter state configuration information to the terminal — S204

The base station determines, according to the transmitter state configuration information, a transmitter state of the terminal after switching — S206

FIG. 2

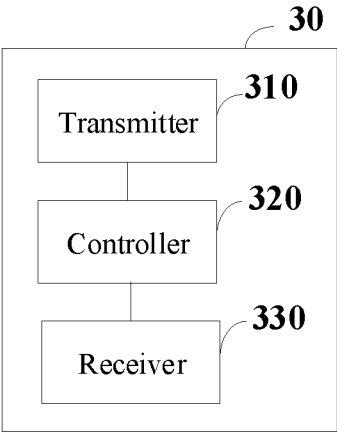

30

Transmitter — 310

Controller — 320

Receiver — 330

FIG. 3

TERMINAL TRANSMITTER STATE DETERMINATION METHOD, SYSTEM, BASE STATION AND TERMINAL

CROSS REFERENCE TO RELATED APPLICATIONS

The present application is a bypass continuation of International Application No. PCT/CN2023/091231, entitled "TERMINAL TRANSMITTER STATE DETERMINATION METHOD, SYSTEM, BASE STATION AND TERMINAL" filed on Apr. 27, 2023, which is based on, claims the benefit of, and claims priority to Chinese Patent Application No. 202210459901.1, filed on Apr. 28, 2022, the entire contents of which are hereby incorporated by reference.

TECHNICAL FIELD

The present disclosure relates to the field of communication technologies and, more particularly, to a method for determining a transmitter state of a terminal, a system, a base station, and a terminal.

BACKGROUND

Super uplink means terminal uplink transmitter switching (UL Tx switching) technologies. Fifth-generation mobile communication technology (e.g., 5th Generation mobile networks, 5th Generation wireless systems or 5th-Generation (5G)) New Radio (NR) Release 16 (Rel-16) super uplink, and Rel-17 super uplink enhancement standardization work have been completed, which can improve NR uplink capacity and uplink coverage and reduces latency.

In multi-carrier uplink transmission schemes in Rel-16 and Rel-17, for terminals that support two transmitter chains, the transmitter switching mechanisms are subject to limitations, that is, a frequency band(s) in which the transmitter chains of the terminal perform uplink transmission can only be dynamically switched among two uplink bands configured by Radio Resource Control (RRC) signaling. In order to further improve an uplink data rate, spectrum utilization and uplink capacity, the terminals that support the two transmitter chains will support dynamically switching the frequency bands for uplink transmission by the two transmitter chains among three or four uplink bands.

BRIEF SUMMARY

According some embodiments of the present disclosure, there is provided a method for determining a transmitter state of a terminal, which is performed by a base station, the method including: sending transmitter state configuration information to the terminal, wherein a band in which transmitter chains of the terminal perform uplink transmission is dynamically switched among more than two bands, and the transmitter state configuration information is configured to, in a case that a selectable transmitter state of the terminal is not unique after switching of the band in which the transmitter chains of the terminal perform the uplink transmission, indicate the transmitter state of the terminal after the switching.

According to some other embodiments of the present disclosure, there is provided a method for determining a transmitter state of a terminal, which is performed by a terminal, the method including: receiving transmitter state configuration information sent by a base station, wherein a band on which transmitter chains of the terminal performs uplink transmission is dynamically switched among more than two bands, and the transmitter state configuration information is configured to, in a case that a selectable transmitter state of the terminal is not unique after switching of the band on which the transmitter chains of the terminal perform the uplink transmission, indicate the transmitter state of the terminal after the switching: and determining, according to the transmitter state configuration information, the transmitter state after the switching, and performing band switching for uplink transmission.

According to some other embodiments of the present disclosure, there is provided a base station, including: a transmitter, configured to send transmitter state configuration information to a terminal, wherein a band on which transmitter chains of the terminal performs uplink transmission is dynamically switched among more than two bands, and the transmitter state configuration information is configured to, in a case that a selectable transmitter state of the terminal is not unique after switching of the band on which the transmitter chains of the terminal perform the uplink transmission, indicate the transmitter state of the terminal after the switching.

According to some other embodiments of the present disclosure, there is provided a terminal, including: a receiver, configured to receive transmitter state configuration information sent by a base station, wherein a band on which transmitter chains of the terminal performs uplink transmission is dynamically switched among more than two bands, and the transmitter state configuration information is configured to, in a case that a selectable transmitter state of the terminal is not unique after switching of the band on which the transmitter chains of the terminal perform the uplink transmission, indicate the transmitter state of the terminal after the switching: and a controller, configured to determine, according to the transmitter state configuration information, the transmitter state after the switching, and to control the transmitter chains to perform band switching for uplink transmission.

According to some other embodiments of the present disclosure, there is provided a communication device, including: a processor: and a memory, coupled to the processor and configured to store instructions which, when being executed by the processor, cause the processor to perform the method for determining the transmitter state of the terminal as described in any of the foregoing embodiments.

According to some other embodiments of the present disclosure, there is provided a communication system, including: the base station as described in any of the foregoing embodiments and the terminal as described in any of the foregoing embodiments.

Other features and advantages of the present disclosure will become apparent from the following detailed description of illustrative embodiments of the present disclosure with reference to the accompanying drawings.

BRIEF DESCRIPTION OF THE DRAWINGS

In order to more clearly illustrate technical solutions in embodiments of the present disclosure or in the prior art, drawings used in the description of the embodiments or the prior art will be briefly described below. Apparently, the drawings in the following description are merely some embodiments of the present disclosure. For those skilled in the art, other drawings may also be obtained based on these drawings without paying any creative work.

FIG. 1 shows a schematic flowchart of a method for determining a transmitter state of a terminal according to some embodiments of the present disclosure.

FIG. 2 shows a schematic flowchart of a method for determining a transmitter state of a terminal according to some other embodiments of the present disclosure.

FIG. 3 shows a schematic structural diagram of a base station according to some embodiments of the present disclosure.

DETAILED DESCRIPTION

Figure 4:
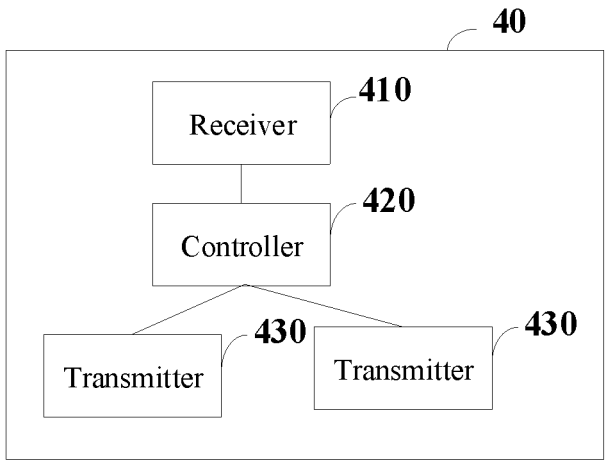
FIG. 4 shows a schematic structural diagram of a terminal according to some embodiments of the present disclosure.

The technical solutions in embodiments of the present disclosure will be described clearly and completely with reference to the drawings in the embodiments of the present disclosure, and it is understood that the embodiments described are only some, but not all, of the embodiments of the present disclosure. The following description of at least one example embodiment is merely illustrative and is in no way intended to limit the disclosure or its application or uses. All other embodiments which are derived by those skilled in the art from the embodiments disclosed herein without inventiveness fall within the scope of the present disclosure.

The inventor found that when two transmitter chains of a terminal perform uplink transmission on one or two bands one or two bands on which two transmitter chains of the terminal perform uplink transmission are dynamically switched among more than two uplink bands.

The present disclosure proposes a method for determining a transmitter state of a terminal, which will be described below with reference to FIGS. 1 to 2.

FIG. 1 is a flowchart of a method for determining a transmitter state of a terminal according to some embodiments of the present disclosure. As shown in FIG. 1, the method in these embodiments includes steps S102 to 104.

In step S102, a base station sends transmitter state configuration information to a terminal. Correspondingly, the terminal receives the transmitter state configuration information sent by the base station.

A band(s) on which transmitter chains of the terminal perform uplink transmission is dynamically switched among more than two bands. For example, the transmitter state configuration information is configured to: in a case that a selectable transmitter state of the terminal is not unique after the band(s) on which the transmitter chains of the terminal perform the uplink transmission is switched, indicate a transmitter state of the terminal after the switching.

Possible cases of the transmitter state and uplink transmission antenna ports of the terminal in three or four bands are first described below with reference to Table 1 and Table 2.

Table 1 shows possible cases of the transmitter state of the terminal and the uplink transmission antenna port in three bands. If the transmitter state of the current uplink transmission is in a different case from the transmitter state of the previous uplink transmission, the terminal needs to perform transmitter switching, a switching period is required for the transmitter switching of the terminal, and during the switching period, the terminal cannot perform the uplink transmission.

TABLE 1

| | the number of transmitter chains in band A + the number of transmitter chains in band B + the number of transmitter chains in band C (xT indicates x transmitter chains) | the number of uplink transmission antenna ports in band A + the number of uplink transmission antenna ports in band B + the number of uplink transmission antenna ports in band C (xP indicates that there are at most x antenna ports on each carrier of the corresponding band) |
|---|---|---|
| Case 1 | 2T + 0T + 0T | 2P + 0P + 0P or 1P + 0P + 0P |
| Case 2 | 0T + 2T + 0T | 0P + 2P + 0P or 0P + 1P + 0P |
| Case 3 | 0T + 0T + 2T | 0P + 0P + 2P or 0P + 0P + 1P |
| Case 4 | 1T + 1T + 0T | 1P + 0P + 0P or 1P + 1P + 0P or 0P + 1P + 0P |
| Case 5 | 1T + 0T + 1T | 1P + 0P + 0P or 1P + 0P + 1P or 0P + 0P + 1P |
| Case 6 | 0T + 1T + 1T | 0P + 1P + 0P or 0P + 1P + 1P or 0P + 0P + 1P | and dynamical switching of the one or two uplink transmission bands among three or four uplink bands is supported, in some cases, after the one or two bands on which the transmitter chains of the terminal perform uplink transmission are switched, a transmitter state is not unique, that is, the base station cannot determine the transmitter state of the terminal after the switching. The transmitter state of the terminal is an important reference indicator for the base station. For example, the transmitter state of the terminal may be used to determine whether a switching period of transmitter switching of the terminal is required, and the terminal cannot perform uplink transmission during the switching period.

A technical problem to be solved by the present disclosure is how to determine a transmitter state of a terminal when For example, case 1 indicates that the two transmitter chains of the terminal can perform the uplink transmission in band A, and in this case, the terminal can perform uplink transmission of two antenna ports in band A, or perform uplink transmission of one antenna port in band A.

Table 2 shows possible cases of the transmitter states and the uplink transmission antenna ports of the terminal in four bands. If the transmitter state of the current uplink transmission is in a different case from the transmitter state of the previous uplink transmission, the terminal needs to perform transmitter switching, a switching period is required for the transmitter switching of the terminal, and during the switching period, the terminal cannot perform the uplink transmission.

TABLE 2

| the number of transmitter chains in band A + the number of transmitter chains in band B + the number of transmitter chains in band C + the number of transmitter chains in band D (xT indicates x transmitter chains) | the number of uplink transmission antenna ports in band A + the number of uplink transmission antenna ports in band B + the number of uplink transmission antenna ports in band C + the number of uplink transmission antenna ports in band D (xP indicates that there are at most x ports on each carrier of the corresponding band) |
|---|---|
| Case 1    2T + 0T + 0T + 0T | 2P + 0P + 0P + 0P or 1P + 0P + 0P + 0P |
| Case 2    0T + 2T + 0T + 0T | 0P + 2P + 0P + 0P or 0P + 1P + 0P + 0P |
| Case 3    0T + 0T + 2T + 0T | 0P + 0P + 2P + 0P or 0P + 0P + 1P + 0P |
| Case 4    0T + 0T + 0T + 2T | 0P + 0P + 0P + 2P or 0P + 0P + 0P + 1P |
| Case 5    1T + 1T + 0T + 0T | 1P + 0P + 0P + 0P or 1P + 1P + 0P + 0P or 0P + 1P + 0P + 0P |
| Case 6    1T + 0T + 1T + 0T | 1P + 0P + 0P + 0P or 1P + 0P + 1P + 0P or 0P + 0P + 1P + 0P |
| Case 7    1T + 0T + 0T + 1T | 1P + 0P + 0P + 0P or 1P + 0P + 0P + 1P or 0P + 0P + 0P + 1P |
| Case 8    0T + 1T + 1T + 0T | 0P + 1P + 0P + 0P or 0P + 1P + 1P + 0P or 0P + 0P + 1P + 0P |
| Case 9    0T + 1T + 0T + IT | 0P + 1P + 0P + 0P or 0P + 1P + 0P + 1P or 0P + 0P + 0P + 1P |
| Case 10   0T + 0T + 1T + IT | 0P + 0P + 1P + 0P or 0P + 0P + 1P + 1P or 0P + 0P + 0P + 1P |

For example, case 5 indicates that one transmitter chain of the terminal can perform uplink transmission in band A, and one transmitter chain of the terminal can perform uplink transmission in band B, and in this case, the terminal can perform one-antenna-port uplink transmission on band A, or perform one-antenna-port uplink transmission on band A and on band B, respectively, or perform one-antenna-port uplink transmission on band B.

In some embodiments, the case that the selectable transmitter state of the terminal is not unique includes that before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

Before the switching, the terminal supports two-antenna-port uplink transmission on at least one carrier on the first band among the more than two bands, and the corresponding transmitter state may be 2T on the first band among the more than two bands (such as three or four bands), and 0T on the remaining bands. After the switching, the terminal does not perform the uplink transmission on any carrier on the first band, and performs one-antenna-port uplink transmission on at least one carrier on the second band among the more than two bands, and the corresponding selectable transmitter states may include: state 1: 1T on the first band (that is, one transmitter chain can perform the uplink transmission on the first band), 1T on the second band, and 0T on other bands: or state 2: 0T on the first band, 2T on the second band, and 0T on the other bands.

For example, as shown in Table 1, before the switching, it is case 1, and the terminal supports two-antenna-port uplink transmission on at least one carrier on the first band (for example, band A). After the switching, the terminal does not perform the uplink transmission on any carrier on band A, and performs one-antenna-port uplink transmission on at least one carrier on a second band (for example, band B) among the more than two bands, which may correspond to case 2 (state 2), case 4 (state 1), and case 6. Case 2 means that the terminal switches the band on which the two transmitter chains perform the uplink transmission to band B. Case 4 means that the terminal switches the band on which one of the two transmitter chains performs the uplink transmission to band B, and retains the band on which the other transmitter chain performs the uplink transmission on band A. Case 6 means that the terminal switches the band on which one of the two transmitter chains performs the uplink transmission to band B, and switches the band on which the other transmitter chain performs the uplink transmission to band C. The transmitter states in cases 2, 4, and 6 are different, but since the base station determines the transmitter state of the terminal through the uplink transmission antenna port condition, the base station cannot determine whether the transmitter chains of the terminal are in the transmitter state corresponding to case 2, case 4, or case 6 after the band on which the transmitter chains of the terminal perform the uplink transmission is switched.

For example, as shown in Table 2, before the switching, it is case 1, and the terminal supports two-antenna-port uplink transmission on at least one carrier on the first band (for example, band A). After the switching, the terminal does not perform the uplink transmission on any carrier on band A, and performs one-antenna-port uplink transmission on at least one carrier on a second band (for example, band B) among the more than two bands, which may correspond to case 2 (state 2), case 5 (state 1), case 8 and case 9. Case 2 means that the terminal switches the band on which the two transmitter chains perform the uplink transmission to band B. Case 5 means that the terminal switches the band on which one of the two transmitter chains performs the uplink transmission to band B, and retains the band on which the other transmitter chain performs the uplink transmission on band A. Case 8 means that the terminal switches the band on which one of the two transmitter chains performs the uplink transmission to band B. and switches the band on which the other transmitter chain performs the uplink transmission to band C. Case 9 means that the terminal switches the band on which one of the two transmitter chains performs the uplink transmission to band B, and switches the band on which the other transmitter chain performs the uplink transmission to band D. The transmitter states in cases 2, 5, 8 and 9 are different, but since the base station determines the transmitter state of the terminal through the uplink transmission antenna port condition, the base station cannot determine which of cases 2, 5, 8 or 9 the transmitter state of the transmitter chains of the terminal corresponds to after the band on which the transmitter chains of the terminal perform the uplink transmission is switched.

For the terminal, if the terminal supports the two-antenna-port uplink transmission on at least one carrier on the first band among the more than two bands before the switching, and then receives uplink scheduling information sent by the base station, where the uplink scheduling information is configured to indicate the terminal to perform one-antenna-port uplink transmission on the second band, the selectable transmitter state of the terminal is not unique. For example, in Table 1, the terminal can perform the switching according to one of cases 2, 4, and 6, and in Table 2, the terminal can perform the switching according to one of cases 2, 5, 8 and 9. If the terminal randomly select one of these cases to perform the switching, the base station cannot determine the transmitter state of the terminal. Determining the transmitter state of the terminal by the base station facilitates to determine whether switching of the transmitter chains by the terminal is required for the subsequent uplink transmission, and whether a switching period is required for the switching of the transmitter chains of the terminal, where the terminal cannot perform the uplink transmission during the switching period.

In the case that the selectable transmitter state of the terminal is not unique after the band(s) on which the transmitter chains of the terminal perform the uplink transmission is switched, the base station may send the transmitter state configuration information to the terminal. The transmitter state considered by the terminal is configured through the transmitter state configuration information. In some embodiments, the transmitter state configuration information is configured to indicate the terminal to consider that one-antenna-port uplink transmission is performed on the first band and the one-antenna-port uplink transmission is performed on the second band, or to indicate the terminal to consider that two-antenna-port uplink transmission is performed on the at least one carrier on the second band.

The terminal considering that one-antenna-port uplink transmission is performed on the first band and one-antenna-port uplink transmission is performed on the second band corresponds to transmitter state 1, and the terminal considering that two-antenna-port uplink transmission is performed on the at least one carrier on the second band corresponds to transmitter state 2. In the foregoing examples in Table 1 and Table 2, although the selectable transmitter states of the terminal after the switching are different, that is, the corresponding cases after the switching in the foregoing examples of Table 1 and Table 2 are different, state 1 and state 2 are common selectable states in the foregoing examples of Table 1 and Table 2. Through the foregoing embodiments, the universal method for determining transmitter state can be employed with respect to the dynamically switching of the band on which the transmitter chains of the terminal performs the uplink transmission among the more than two various bands.

Further, in some embodiments, the transmitter state configuration information is a first uplink transmitter switching dual-uplink transmitter state (uplinkTxSwitching-DualUL-TxState information) element in a Radio Resource Control (RRC) information element, the first uplinkTxSwitching-DualUL-TxState information element is configured as a first preset value to indicate the terminal to consider that the one-antenna-port uplink transmission is performed on the first band and the one-antenna-port uplink transmission is performed on the second band, and the first uplinkTxSwitching-DualUL-TxState information element is configured as a second preset value to indicate the terminal to consider that the two-antenna-port uplink transmission is performed on at least one carrier on the second band.

For example, uplinkTxSwitching-DualUL-TxState is configured as OneT, which is used to indicate the terminal to consider that one-antenna-port uplink transmission is performed on the first band and one-antenna-port uplink transmission is performed on the second band. Alternatively, uplinkTxSwitching-DualUL-TxState is configured as twoT, which is used to indicate the terminal to consider that two-antenna-port uplink transmission is performed on at least one carrier on the second band. If uplinkTxSwitching-DualUL-TxState in the RRC information element received by the terminal is configured as OneT, the terminal shall consider this as if one-antenna-port uplink transmission is performed on the first band and one-antenna-port uplink transmission is performed on the second band. Otherwise, the terminal shall consider this as if one-antenna-port uplink transmission is performed on the second band.

For example, in the above Table 1, in a scenario that the band(s) on which the transmitter chains of the terminal perform the uplink transmission is case 1 before the switching and it may be case 2, 4 or 6 after the switching, if uplinkTxSwitching-DualUL-TxState in the RRC information element from the base station received by the terminal is configured as OneT, in the situation that the transmitter chain of the terminal may be switched from case 1 to case 2 or 4 or 6 after the switching, the terminal switches to case 4 according to OneT configured for uplink TxSwitching-DualUL-TxState, that is, the terminal switches the band on which one of the two transmitter chains performs the uplink transmission to band B, and retains the band on which the other transmitter chain performs the uplink transmission on band A. For example, in the above Table 2, in a scenario that the band(s) on which the transmitter chains of the terminal perform the uplink transmission is case 1 before the switching and it may be case 2, 5, 8 or 9 after the switching, if uplinkTxSwitching-DualUL-TxState in the RRC information element from the base station received by the terminal is configured as OneT, in the situation that the transmitter chain of the terminal may be switched from case 1 to case 2 or 5 or 8 or 9 after the switching, the terminal switches to case 5 according to OneT configured for uplinkTxSwitching-DualUL-TxState, that is, the terminal switches the band on which one of the two transmitter chains performs the uplink transmission to band B, and retains the band on which the other transmitter chain performs the uplink transmission on band A.

In some embodiments, the case that the selectable transmitter state of the terminal is not unique includes that before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

Before the switching, the terminal performs one-antenna-port uplink transmission on at least one carrier on at least one of a first band and a second band among the more than two bands, and the corresponding transmitter state may be 1T and 1T respectively on the first band and the second band, and 0T on the remaining bands, among the more than two bands (for example, 3 or 4 bands). After the switching, the terminal does not perform the uplink transmission on the first band or the second band, and performs one-antenna-port uplink transmission on at least one carrier on a third band among the more than two bands, and the corresponding transmitter state may include: state 1: 1T on the second band, 1T on the third band, and 0T on the other band(s): or state 2: 1T on the first band, 1T on the third band, and 0T on the other band(s): or state 3: 2T on the third band, and 0T on the other band(s).

For example, as shown in Table 1, before the switching, it is case 4, the terminal performs one-antenna-port uplink transmission (1P+1P+0P) on the first band (band A) and the second band (band B), respectively. After the switching, the terminal does not perform the uplink transmission on band A and band B, and performs one-antenna-port uplink transmission on at least one carrier on the third band (for example, band C) among the more than two bands, which may correspond to case 3 (state 3), case 5 (state 2), or case 6 (state 1). Case 3 means that the terminal switches the band on which the two transmitter chains perform the uplink transmission to band C. Case 5 means that the terminal switches the band on which one of the two transmitter chains performs the uplink transmission from band B to band C, and retains the band on which the other of the two transmitter chains performs the uplink transmission on band A. Case 6 means that the terminal switches the band on which one of the two transmitter chains performs the uplink transmission from band A to band C, and retains the band on which the other of the two transmitter chains performs the uplink transmission on band B. The transmitter states in cases 3, 5, and 6 are different, but since the base station determines the transmitter state of the terminal through the uplink transmission antenna port condition, the base station cannot determine whether the transmitter chains of the terminal are in the transmitter state corresponding to case 3, case 5 or case 6 after the band on which the transmitter chains of the terminal perform the uplink transmission is switched.

For example, as shown in Table 2, before the switching, it is case 5, the terminal performs one-antenna-port uplink transmission (1P+1P+0P+0P) on the first band (for example, band A) and the second band (for example, band B), respectively. After the switching, the terminal does not perform the uplink transmission on band A and band B, and performs one-antenna-port uplink transmission on at least one carrier on the third band (for example, band C) among the more than two bands, which may correspond to case 3 (state 3), case 6 (state 2), case 8 (state 1), or case 10. Case 3 means that the terminal switches the band on which the two transmitter chains perform the uplink transmission to band C. Case 6 means that the terminal switches the band on which one of the two transmitter chains performs the uplink transmission from band B to band C, and retains the band on which the other of the two transmitter chains performs the uplink transmission on band A. Case 8 means that the terminal switches the band on which one of the two transmitter chains performs the uplink transmission from band A to band C, and retains the band on which the other of the two transmitter chains performs the uplink transmission on band B. Case 10 means that the terminal switches the band on which the two transmitter chains perform the uplink transmission from bands A and B to bands C and D. The transmitter states in cases 3, 6, 8 and 10 are different, but since the base station determines the transmitter state of the terminal through the uplink transmission antenna port condition, the base station cannot determine whether the transmitter chains of the terminal are in the transmitter state corresponding to case 3, case 6, case 8 or case 10 after the band on which the transmitter chains of the terminal perform the uplink transmission is switched.

For the terminal, if the terminal performs the one-antenna-port uplink transmission on at least one carrier on at least one band of the first band and the second band before the switching, and then receives uplink scheduling information sent by the base station, where the uplink scheduling information is configured to indicate the terminal to perform one-antenna-port uplink transmission on the third band, the selectable transmitter state of the terminal is not unique. For example, in Table 1, the terminal may perform the switching according to cases 3, 5 or 6, and in Table 2, the terminal may perform the switching according to cases 3, 6, 8 or 10. If the terminal randomly select one of these cases to perform the switching, the base station cannot determine the transmitter state of the terminal. Determining the transmitter state of the terminal by the base station facilitates to determine whether switching of the transmitter chains by the terminal is required for the subsequent uplink transmission, and whether a switching period is required for the switching of the transmitter chains of the terminal, where the terminal cannot perform the uplink transmission during the switching period.

In the case that the selectable transmitter state of the terminal is not unique after the band on which the transmitter chains of the terminal perform the uplink transmission is switched as described above, the base station may send the transmitter state configuration information to the terminal. The transmitter state considered by the terminal is configured through the transmitter state configuration information. In some embodiments, the transmitter state configuration information is configured to indicate the terminal to consider that the one-antenna-port uplink transmission is performed on at least one carrier on the first band, and the one-antenna-port uplink transmission is performed on the at least one carrier on the third band; or the transmitter state configuration information is configured to indicate the terminal to consider that the one-antenna-port uplink transmission is performed on at least one carrier on the second band, and the one-antenna-port uplink transmission is performed on the at least one carrier on the third band: or the transmitter state configuration information is configured to indicate the terminal to consider that two-antenna-port uplink transmission is performed on the at least one carrier on the third band.

The terminal considering that the one-antenna-port uplink transmission is performed on at least one carrier on the first band and the one-antenna-port uplink transmission is performed on at least one carrier on the third band corresponds to transmitter state 2. The terminal considering that the one-antenna-port uplink transmission is performed on at least one carrier on the second band and the one-antenna-port uplink transmission is performed on at least one carrier on the third band corresponds to transmitter state 1. The terminal considering that the two-antenna-port uplink transmission is performed on at least one carrier on the third band corresponds to transmitter state 3. In the foregoing examples in Table 1 and Table 2, although the selectable transmitter states of the terminal after the switching are different, that is, the corresponding cases after the switching in the foregoing examples of Table 1 and Table 2 are different, state 1, state 2 and state 3 are common selectable states in the foregoing examples of Table 1 and Table 2. Through the foregoing embodiments, the universal method for determining transmitter state can be employed with respect to the dynamically switching of the band on which the transmitter chains of the terminal performs the uplink transmission among the more than two various bands.

Further, in some embodiments, the transmitter state configuration information is a second uplinkTxSwitching-DualUL-TxState information element in a Radio Resource Control (RRC) information element, the second uplinkTxSwitching-DualUL-TxState information element is configured as a third preset value to indicate the terminal to consider that the one-antenna-port uplink transmission is performed on at least one carrier on the first band and the one-antenna-port uplink transmission is performed on at least one carrier on the third band: the second uplinkTx-Switching-DualUL-TxState information element is configured as a fourth preset value to indicate the terminal to consider that the one-antenna-port uplink transmission is performed on at least one carrier on the second band and the one-antenna-port uplink transmission is performed on at least one carrier on the third band: and the second uplink TxSwitching-DualUL-TxState information element is configured as a fifth preset value to indicate the terminal to consider that the two-antenna-port uplink transmission is performed on at least one carrier on the third band.

For example, if uplinkTxSwitching-DualUL-TxState in the RRC information element received by the terminal is configured as the third preset value, the terminal shall consider this as if one-antenna-port uplink transmission is performed on at least one carrier on the first band and one-antenna-port uplink transmission is performed on at least one carrier on the third band. If uplinkTxSwitching-DualUL-TxState in the RRC information element received by the terminal is configured as the fourth preset value, the terminal shall consider this as if one-antenna-port uplink transmission is performed on at least one carrier on the second band and one-antenna-port uplink transmission is performed on at least one carrier on the third band. If uplinkTxSwitching-DualUL-TxState in the RRC information element received by the terminal is configured as the fifth preset value, the terminal shall consider this as if two-antenna-port uplink transmission is performed on at least one carrier on the third band.

For example, in above Table 1, in a scenario where the band(s) on which the transmitter chains of the terminal perform the uplink transmission is case 4 before the switching and it may be case 3, 5 or 6 after the switching, if uplinkTxSwitching-DualUL-TxState in the RRC information element from the base station received by the terminal is configured as the third preset value, in the situation that the transmitter chains of the terminal may be switched from case 4 to case 3 or 5 or 6 after the switching, the terminal switches to case 5 according to the third preset value configured for uplinkTxSwitching-DualUL-TxState, that is, the terminal switches the band on which one of the two transmitter chains performs the uplink transmission from band B to band C, and retains the band on which the other of the two transmitter chains performs the uplink transmission on band A.

For example, in above Table 2, in a scenario where the band(s) on which the transmitter chains of the terminal perform the uplink transmission is case 5 before the switching and it may be case 3, 6, 8 or 10 after the switching, if uplinkTxSwitching-DualUL-TxState in the RRC information element from the base station received by the terminal is configured as the third preset value, in the situation that the transmitter chains of the terminal may be switched from case 5 to case 3 or 6 or 8 or 10 after the switching, the terminal switches to case 6 according to the third preset value configured for uplinkTxSwitching-DualUL-TxState, that is, the terminal switches the band on which one of the two transmitter chains performs the uplink transmission from band B to band C, and retains the band on which the other of the two transmitter chains performs the uplink transmission on band A.

The base station determines the transmitter state of the terminal after the switching according to the transmitter state configuration information. Correspondingly, the terminal determines the transmitter state after the switching according to the transmitter state configuration information and performs band switching for uplink transmission.

The base station may directly determine the transmitter state of the terminal after the switching based on the transmitter state configuration information, and can determine whether switching of the transmitter chains by the terminal is required for the subsequent uplink transmission, and whether a switching period is required for the switching of the transmitter chains of the terminal, etc. In the case that the selectable transmitter state of the terminal is not unique, the terminal may perform the band switching for the uplink transmission according to the transmitter state configuration information.

In the above embodiments, in the scenario where the one or two bands on which the transmitter chains of the terminal perform the uplink transmission are dynamically switched among more than two bands, the base station sends the transmitter state configuration information to the terminal, and the transmitter state configuration information is configured to, in a case that a selectable transmitter state of the terminal is not unique after the band on which the transmitter chains of the terminal perform the uplink transmission is switched, indicate the transmitter state of the terminal after the switching, so that the terminal performs the uplink transmission according to the transmitter state configuration information, and the base station can determine the transmitter state of the terminal after the switching based on the transmitter state configuration information, which facilitates the base station to determine whether switching of the transmitter chains by the terminal is required for the subsequent uplink transmission, and whether a switching period is required for the switching of the transmitter chains of the terminal, thereby determining whether there is an interruption in the uplink transmission due to the transmitter switching of the terminal. With the solution in the above embodiments, the NR uplink data rate, the spectrum utilization and the uplink capacity can be further improved.

Some other embodiments of the method for determining the transmitter state of the terminal in the present disclosure are described below with reference to FIG. 2.

FIG. 2 is a flowchart of a method for determining a transmitter state of a terminal according to some other embodiments of the present disclosure. As shown in FIG. 2, the method in these embodiments includes steps S202 to 206.

In step S202, a terminal sends capability information to a base station, and correspondingly, the base station receives the capability information of the terminal.

For example, the capability information includes one or more of: a transmitter switching option supported by the terminal being dual uplink (DualUL), information of each band of more than two bands, and two transmitter chains being supported by the terminal on each band of the more than two bands.

In the step S204, the base station sends transmitter switching configuration information and transmitter state configuration information to the terminal. Correspondingly, the terminal receives the transmitter switching configuration information and the transmitter state configuration information sent by the base station.

For example, the transmitter switching configuration information includes one or more of: configuration information of each band of more than two bands, transmitter switching mode configuration information, and transmitter switching option configuration information, where the transmitter switching mode configuration information is used to configure the terminal to support two transmitter chains on each band of the more than two bands, and the transmitter switching option configuration information is used to configure a transmitter switching option as the dual uplink.

The solution of the present disclosure may be applied to the situation that the terminal supports two transmitter chains, supports simultaneous uplink transmission on carriers on different bands, and supports a band on which the two transmitter chains perform the uplink transmission to be dynamically switched among more than two uplink bands. The terminal can inform the base station, through the capability reporting, its capability that it supports simultaneous uplink transmission on carriers on different bands, that is, it supports the dual uplink (DualUL), and supports the two transmitter chains to dynamically switch among the more than two uplink bands. The base station configures a uplink transmitter switching mode of the terminal as supporting the two transmitter chains on each band, configures a uplink transmitter switching option (uplinkTxSwitchingOption) as supporting simultaneous uplink transmission, that is, dual uplink (DualUL), on carriers on different bands, and configures more than two bands (e.g., three or four bands) that can be used for the transmitter switching. In this case, a multi-carrier uplink transmission scenario that can be applicable is, for example, multi-carrier uplink transmission of inter-band Carrier Aggregation (CA).

The base station may first send the transmitter switching configuration information to the terminal, and then send the transmitter state configuration information to the terminal. The base station may also first send the transmitter state configuration information to the terminal, and then send the transmitter switching configuration information to the terminal. The base station may also send the transmitter switching configuration information and the transmitter state configuration information to the terminal simultaneously.

In step S206, the terminal determines the transmitter state after the switching according to the transmitter state configuration information and performs band switching for uplink transmission.

For steps S204 to S206, reference may be made to step S102, which will not be described again here.

In the above embodiments, the transmitter state configuration information sent by the base station to the terminal is configured to, in a case that a selectable transmitter state of the terminal is not unique after the band on which the transmitter chains of the terminal perform the uplink transmission is switched, indicate the transmitter state of the terminal after the switching. For the case that the selectable transmitter state of the terminal is not unique after the band(s) on which the transmitter chains of the terminal perform the uplink transmission is switched, the following method can also be used to determine the transmitter state of the terminal.

Scheme (1), the transmitter state of the terminal after the switching is specified by a protocol, that is, is preset, in the case that the selectable transmitter state of the terminal is not unique after the band on which the transmitter chains of the terminal perform the uplink transmission is switched.

Scheme (2), the transmitter state of the terminal after the switching is determined by the terminal and reported to the base station through the uplink transmission in the case that the selectable transmitter state of the terminal is not unique after the band on which the transmitter chains of the terminal perform the uplink transmission is switched.

For the above two schemes (1) and (2), the case that the selectable transmitter state of the terminal is not unique includes: case 1: before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands; and case 2: before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands. Reference may be made to the foregoing embodiments, which will not be described again here.

In the scheme (1), for case 1, it may be specified by the protocol (may be preset) that the terminal considers that one-antenna-port uplink transmission is performed on the first band and one-antenna-port uplink transmission is performed on the second band, or the terminal considers that two-antenna-port uplink transmission is performed on at least one carrier on the second band. For case 2, it may be specified by the protocol (may be preset) that the terminal considers that one-antenna-port uplink transmission is performed on at least one carrier on the first band, and one-antenna-port uplink transmission is performed on at least one carrier on the third band: or the terminal considers that one-antenna-port uplink transmission is performed on at least one carrier on the second band, and one-antenna-port uplink transmission is performed on at least one carrier on the third band: or the terminal considers that two-antenna-port uplink transmission is performed on at least one carrier on the third band.

In the scheme (2), for case 1, the terminal considers that one-antenna-port uplink transmission is performed on the first band and one-antenna-port uplink transmission is performed on the second band, or the terminal considers that two-antenna-port uplink transmission is performed on at least one carrier on the second band. For case 2, the terminal considers that one-antenna-port uplink transmission is performed on at least one carrier on the first band, and one-antenna-port uplink transmission is performed on at least one carrier on the third band: or the terminal considers that one-antenna-port uplink transmission is performed on at least one carrier on the second band, and one-antenna-port uplink transmission is performed on at least one carrier on the third band: or the terminal considers that two-antenna-port uplink transmission is performed on at least one carrier on the third band. The terminal reports the uplink transmission port condition considered by the terminal to the base station, and it is reported in the upcoming uplink transmission by the terminal.

The present disclosure further provides a base station, which will be described below with reference to FIG. 3.

FIG. 3 is a structural diagram of a base station according to some embodiments of the present disclosure. As shown in FIG. 3, the base station 30 of these embodiments includes a transmitter 310.

The transmitter 310 is configured to send transmitter state configuration information to the terminal, where a band on which transmitter chains of the terminal perform uplink transmission is dynamically switched among more than two bands, and the transmitter state configuration information is configured to, in a case that a selectable transmitter state of the terminal is not unique after the band on which the transmitter chains of the terminal perform the uplink transmission is switched, indicate the transmitter state of the terminal after the switching.

In some embodiments, the case that the selectable transmitter state of the terminal is not unique includes that before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

In some embodiments, the transmitter state configuration information is configured to indicate the terminal to consider that one-antenna-port uplink transmission is performed on the first band and one-antenna-port uplink transmission is performed on the second band, or to indicate the terminal to consider that two-antenna-port uplink transmission is performed on at least one carrier on the second band.

In some embodiments, the transmitter state configuration information is a first uplinkTxSwitching-DualUL-TxState information element in a Radio Resource Control (RRC) information element, the first uplinkTxSwitching-DualUL-TxState information element is configured as a first preset value to indicate the terminal to consider that one-antenna-port uplink transmission is performed on the first band and one-antenna-port uplink transmission is performed on the second band: and the first uplinkTxSwitching-DualUL-TxState information element is configured as a second preset value to indicate the terminal to consider that two-antenna-port uplink transmission is performed on at least one carrier on the second band.

In some embodiments, the case that the selectable transmitter state of the terminal is not unique includes that before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

In some embodiments, the transmitter state configuration information is configured to indicate the terminal to consider that one-antenna-port uplink transmission is performed on at least one carrier on the first band, and one-antenna-port uplink transmission is performed on at least one carrier on the third band: or the transmitter state configuration information is configured to indicate the terminal to consider that one-antenna-port uplink transmission is performed on at least one carrier on the second band, and one-antenna-port uplink transmission is performed on at least one carrier on the third band: or the transmitter state configuration information is configured to indicate the terminal to consider that two-antenna-port uplink transmission is performed on at least one carrier on the third band.

In some embodiments, the transmitter state configuration information is a second uplinkTxSwitching-DualUL-TxState information element in a Radio Resource Control (RRC) information element, the second uplinkTxSwitching-DualUL-TxState information element is configured as a third preset value to indicate the terminal to consider that the one-antenna-port uplink transmission is performed on the at least one carrier on the first band, and the one-antenna-port uplink transmission is performed on the at least one carrier on the third band: the second uplinkTxSwitching-DualUL-TxState information element is configured as a fourth preset value to indicate the terminal to consider that the one-antenna-port uplink transmission is performed on the at least one carrier on the second band, and the one-antenna-port uplink transmission is performed on the at least one carrier on the third band: and the second uplinkTxSwitching-DualUL-TxState information element is configured as a fifth preset value to indicate the terminal to consider that the two-antenna-port uplink transmission is performed on the at least one carrier on the third band.

In some embodiments, the base station 30 further includes: a receiver 320, configured to receive capability information of the terminal, the capability information includes one or more of: a transmitter switching option supported by the terminal being dual uplink, information of each band of the more than two bands, and two transmitter chains being supported by the terminal on each band of the more than two bands: and the transmitter 310 is further configured to send transmitter switching configuration information to the terminal, the transmitter switching configuration information includes one or more of: configuration information of each band of the more than two bands, transmitter switching mode configuration information, and transmitter switching option configuration information, where the transmitter switching mode configuration information is configured to configure the terminal to support two transmitter chains on each band of the more than two bands, and the transmitter switching option configuration information is configured to configure a transmitter switching option as the dual uplink.

The present disclosure further provides a terminal, which will be described below with reference to FIG. 4.

FIG. 4 is a structural diagram of a terminal according to some embodiments of the present disclosure. As shown in FIG. 4, the terminal 40 of these embodiments includes: a receiver 410 and a controller 420.

The receiver 410 is configured to receive transmitter state configuration information sent by a base station, a band on which transmitter chains of the terminal perform uplink transmission is dynamically switched among more than two bands, and the transmitter state configuration information is configured to, in a case that a selectable transmitter state of the terminal is not unique after the band on which the transmitter chains of the terminal perform the uplink transmission is switched, indicate the transmitter state of the terminal after the switching.

In some embodiments, the case that the selectable transmitter state of the terminal is not unique includes that before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

In some embodiments, the transmitter state configuration information is configured to indicate the terminal to consider that one-antenna-port uplink transmission is performed on the first band and the one-antenna-port uplink transmission is performed on the second band, or to indicate the terminal to consider that two-antenna-port uplink transmission is performed on the at least one carrier on the second band.

In some embodiments, the transmitter state configuration information is a first uplinkTxSwitching-DualUL-TxState information element in a Radio Resource Control (RRC) information element, the first uplinkTxSwitching-DualUL-TxState information element is configured as a first preset value to indicate the terminal to consider that the one-antenna-port uplink transmission is performed on the first band and the one-antenna-port uplink transmission is performed on the second band: and the first uplinkTxSwitching-DualUL-TxState information element is configured as a second preset value to indicate the terminal to consider that the two-antenna-port uplink transmission is performed on the at least one carrier on the second band.

In some embodiments, the case that the selectable transmitter state of the terminal is not unique includes that before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

In some embodiments, the transmitter state configuration information is configured to indicate the terminal to consider that the one-antenna-port uplink transmission is performed on at least one carrier on the first band, and the one-antenna-port uplink transmission is performed on at least one carrier on the third band: or the transmitter state configuration information is configured to indicate the terminal to consider that the one-antenna-port uplink transmission is performed on at least one carrier on the second band, and the one-antenna-port uplink transmission is performed on at least one carrier on the third band; or the transmitter state configuration information is configured to indicate the terminal to consider that two-antenna-port uplink transmission is performed on at least one carrier on the third band.

In some embodiments, the transmitter state configuration information is a second uplinkTxSwitching-DualUL-TxState information element in a Radio Resource Control (RRC) information element, the second uplinkTxSwitching-DualUL-TxState information element is configured as a third preset value to indicate the terminal to consider that the one-antenna-port uplink transmission is performed on the at least one carrier on the first band, and the one-antenna-port uplink transmission is performed on the at least one carrier on the third band: the second uplinkTxSwitching-DualUL-TxState information element is configured as a fourth preset value to indicate the terminal to consider that the one-antenna-port uplink transmission is performed on the at least one carrier on the second band, and the one-antenna-port uplink transmission is performed on the at least one carrier on the third band: and the second uplinkTxSwitching-DualUL-TxState information element is configured as a fifth preset value to indicate the terminal to consider that the two-antenna-port uplink transmission is performed on the at least one carrier on the third band.

The controller 420 is configured to determine, according to the transmitter state configuration information, the transmitter state after the switching, and perform band switching for uplink transmission.

In some embodiments, the terminal 40 may further include two transmitter chains 430 configured to perform uplink transmission. A band(s) used by the transmitter chains 430 for the uplink transmission is dynamically switched among more than two bands.

In some embodiments, the transmitter chains 430 are further configured to send capability information to the base station, the capability information includes one or more of: a transmitter switching option supported by the terminal being dual uplink, information of each band of the more than two bands, and two transmitter chains being supported by the terminal on each band of the more than two bands: and the receiver 410 is further configured to receive transmitter switching configuration information sent by the base station, the transmitter switching configuration information includes one or more of: configuration information of each band of the more than two bands, transmitter switching mode configuration information, and transmitter switching option configuration information, where the transmitter switching mode configuration information is configured to configure the terminal to support the two transmitter chains on each band of the more than two bands, and the transmitter switching option configuration information is configured to configure a transmitter switching option as the dual uplink.

A communication device (e.g., the base station or the terminal) in embodiments of the present disclosure may each be implemented by various computing devices or computer systems, as described below in conjunction with FIGS. 5 and 6.

Figure 5:
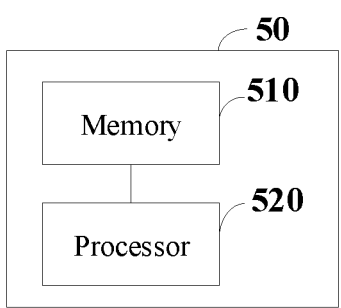
FIG. 5 shows a schematic structural diagram of a communication device according to some embodiments of the present disclosure.

FIG. 5 is a structural diagram of a communication device according to some embodiments of the present disclosure. As shown in FIG. 5, the device 50 of these embodiments includes: a memory 510 and a processor 520 coupled to the memory 510. The processor 520 is configured to perform the method for determining the transmitter state of the terminal in any of the embodiments of the present disclosure based on instructions stored in the memory 510.

The memory 510 may include, for example, a system memory, a fixed non-volatile storage medium, etc. The system memory stores, for example, an operating system, an application, a boot loader, a database, and other programs.

Figure 6:
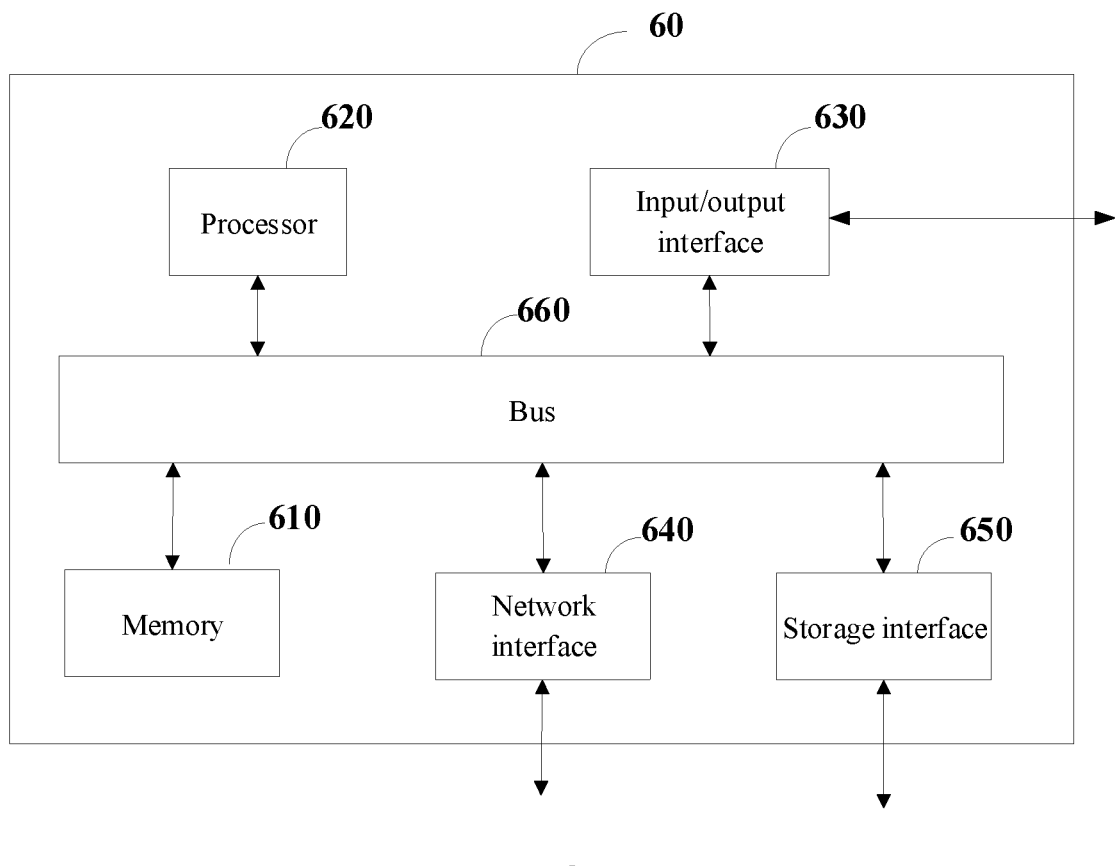
FIG. 6 shows a schematic structural diagram of a communication device according to some other embodiments of the present disclosure.

FIG. 6 is a structural diagram of a communication device according to some other embodiments of the present disclosure. As shown in FIG. 6, the device 60 of these embodiments include: a memory 610 and a processor 620, which are similar to the memory 510 and the processor 520, respectively. The device 60 may also include an input/output interface 630, a network interface 640, a storage interface 650, etc. These interfaces 630, 640, 650 and the memory 610 and the processor 620 may be connected through, for example, a bus 660. The input/output interface 630 provides a connection interface for input and output devices such as a display, a mouse, a keyboard, and a touch screen. The network interface 640 provides a connection interface for various networked devices, for example, the networked device may be connected to a database server or a cloud storage server. The storage interface 650 provides a connection interface for external storage devices such as a SD card and a USB disk.

Figure 7:
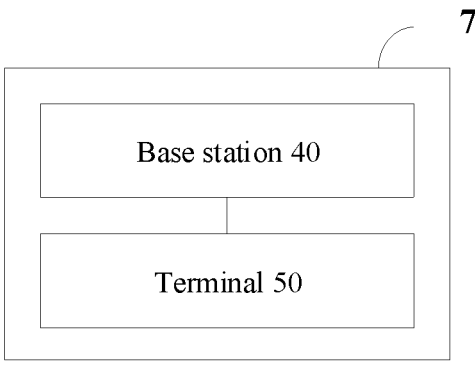
FIG. 7 shows a schematic structural diagram of a communication system according to some embodiments of the present disclosure.

The present disclosure further provides a communication system. As shown in FIG. 7, the communication system 7 includes the base station 30 and the terminal 40 in any of the aforementioned embodiments.

Those skilled in the art shall understand that embodiments of the present disclosure may be provided as a method, a system, or a computer program product. Therefore, the present disclosure may take the form of complete hardware embodiments, complete software embodiments, or embodiments combining software and hardware aspects. In addition, the present disclosure may also take the form of a computer program product implemented on one or more computer-usable non-transitory storage media (including but not limited to a magnetic disk memory, a CD-ROM, and an optical memory) including computer-usable program codes.

The present disclosure is described with reference to flowcharts and/or block diagrams of the method, device (system), and computer program product according to embodiments of the present disclosure. It can be understood that each process and/or block in the flowcharts and/or block diagrams, and combinations of the processes and/or blocks in the flowcharts and/or block diagrams may be implemented by computer program instructions. These computer program instructions may be provided to a general computer, a dedicated computer, an embedded processor, or processors of other programmable data processing devices to generate a machine to enable the instructions to be executed by the computer or the processors of other programmable data processing devices to generate a device for implementing functions defined in one or more processes in the flowcharts, and/or one or more blocks in the block diagrams.

These computer program instructions may also be stored in a computer-readable memory that can direct a computer or other programmable data processing devices to operate in a particular manner, such that the instructions stored in the computer-readable memory generate a product including an instruction device that implements functions defined in one or more processes in the flowcharts, and/or one or more blocks in the block diagrams.

These computer program instructions may also be loaded to the computer or other programmable data processing devices, such that a series of operations or steps are performed on the computer or other programmable devices to generate processing implemented by the computer, and the instructions executed on the computer or other programmable devices thus provide steps for implementing functions defined in one or more processes in the flowcharts, and/or one or more blocks in the block diagrams.

Those described above are only various embodiments of the present disclosure and are not intended to limit the present disclosure. Any modifications, equivalent substitutions, improvements, etc. made within the spirit and principles of the present disclosure shall be included in the protection scope of the present disclosure.

What is claimed is:

1. A method for determining a transmitter state of a terminal, performed by a base station, comprising:
   sending transmitter state configuration information to the terminal, wherein a band on which one or more transmitter chains of the terminal perform uplink transmission is dynamically switched among more than two bands, and the transmitter state configuration information is configured to, in a case that a selectable transmitter state of the terminal is not unique after the band on which the one or more transmitter chains of the terminal perform the uplink transmission is switched, indicate the transmitter state of the terminal after the switching.

2. The method for determining the transmitter state according to claim 1, wherein the case that the selectable transmitter state of the terminal is not unique comprises that:
   before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

3. The method for determining the transmitter state according to claim 2, wherein the transmitter state configuration information is configured to indicate the terminal to consider that one-antenna-port uplink transmission is performed on the first band and the one-antenna-port uplink transmission is performed on the second band, or to indicate the terminal to consider that two-antenna-port uplink transmission is performed on the at least one carrier on the second band.

4. The method for determining the transmitter state according to claim 3, wherein the transmitter state configuration information is a first uplinkTxSwitching-DualUL-TxState information element in a Radio Resource Control (RRC) information element, the first uplinkTxSwitching-DualUL-TxState information element is configured as a first preset value to indicate the terminal to consider that the one-antenna-port uplink transmission is performed on the first band and the one-antenna-port uplink transmission is performed on the second band, and the first uplinkTxSwitching-DualUL-TxState information element is configured as a second preset value to indicate the terminal to consider that the two-antenna-port uplink transmission is performed on the at least one carrier on the second band.

5. The method for determining the transmitter state according to claim 1, wherein the case that the selectable transmitter state of the terminal is not unique comprises that:
   before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

6. The method for determining the transmitter state according to claim 5, wherein,
   the transmitter state configuration information is configured to indicate the terminal to consider that the one-antenna-port uplink transmission is performed on at least one carrier on the first band, and the one-antenna-port uplink transmission is performed on at least one carrier on the third band; or
   the transmitter state configuration information is configured to indicate the terminal to consider that the one-antenna-port uplink transmission is performed on at least one carrier on the second band, and the one-antenna-port uplink transmission is performed on at least one carrier on the third band; or the transmitter state configuration information is configured to indicate the terminal to consider that two-antenna-port uplink transmission is performed on at least one carrier on the third band.

7. The method for determining the transmitter state according to claim 6, wherein the transmitter state configuration information is a second uplinkTxSwitching-DualUL-TxState information element in a Radio Resource Control (RRC) information element, the second uplinkTxSwitching-DualUL-TxState information element is configured as a third preset value to indicate the terminal to consider that the one-antenna-port uplink transmission is performed on the at least one carrier on the first band and the one-antenna-port uplink transmission is performed on the at least one carrier on the third band; the second uplinkTxSwitching-DualUL-TxState information element is configured as a fourth preset value to indicate the terminal to consider that the one-antenna-port uplink transmission is performed on the at least one carrier on the second band and the one-antenna-port uplink transmission is performed on the at least one carrier on the third band; and the second uplinkTxSwitching-DualUL-TxState information element is configured as a fifth preset value to indicate the terminal to consider that the two-antenna-port uplink transmission is performed on the at least one carrier on the third band.

8. The method for determining the transmitter state according to claim 1, further comprising:

receiving, by the base station, capability information of the terminal, wherein the capability information comprises one or more of: a transmitter switching option supported by the terminal being dual uplink, information of each band of the more than two bands, and two transmitter chains being supported by the terminal on each band of the more than two bands; and sending, by the base station, transmitter switching configuration information to the terminal, wherein the transmitter switching configuration information comprises one or more of: configuration information of each band of the more than two bands, transmitter switching mode configuration information, and transmitter switching option configuration information, and wherein the transmitter switching mode configuration information is configured to configure the terminal to support the two transmitter chains on each band of the more than two bands, and the transmitter switching option configuration information is configured to configure the transmitter switching option to be the dual uplink.

9. A method for determining a transmitter state of a terminal, performed by the terminal, comprising:

receiving transmitter state configuration information sent by a base station, wherein a band on which one or more transmitter chains of the terminal perform uplink transmission is dynamically switched among more than two bands, and the transmitter state configuration information is configured to, in a case that a selectable transmitter state of the terminal is not unique after the band on which the one or more transmitter chains of the terminal perform the uplink transmission is switched, indicate the transmitter state of the terminal after the switching; and determining, according to the transmitter state configuration information, the transmitter state of the terminal after the switching, and performing band switching for uplink transmission.

10. The method for determining the transmitter state according to claim 9, further comprising:

sending capability information to the base station, wherein the capability information comprises one or more of: a transmitter switching option supported by the terminal being dual uplink, information of each band of the more than two bands, and two transmitter chains being supported by the terminal on each band of the more than two bands; and receiving transmitter switching configuration information sent by the base station, wherein the transmitter switching configuration information comprises one or more of: configuration information of each band of the more than two bands, transmitter switching mode configuration information, and transmitter switching option configuration information, and wherein the transmitter switching mode configuration information is configured to configure the terminal to support the two transmitter chains on each band of the more than two bands, and the transmitter switching option configuration information is configured to configure the transmitter switching option to be the dual uplink.

11. The method for determining the transmitter state according to claim 9, wherein the case that the selectable transmitter state of the terminal is not unique comprises that:

before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

12. The method for determining the transmitter state according to claim 11, wherein the transmitter state configuration information is configured to indicate the terminal to consider that one-antenna-port uplink transmission is performed on the first band and the one-antenna-port uplink transmission is performed on the second band, or to indicate the terminal to consider that two-antenna-port uplink transmission is performed on the at least one carrier on the second band.

13. The method for determining the transmitter state according to claim 12, wherein the transmitter state configuration information is a first uplinkTxSwitching-DualUL-TxState information element in a Radio Resource Control (RRC) information element, the first uplinkTxSwitching-DualUL-TxState information element is configured as a first preset value to indicate the terminal to consider that the one-antenna-port uplink transmission is performed on the first band and the one-antenna-port uplink transmission is performed on the second band, and the first uplinkTxSwitching-DualUL-TxState information element is configured as a second preset value to indicate the terminal to consider that the two-antenna-port uplink transmission is performed on the at least one carrier on the second band.

14. The method for determining the transmitter state according to claim 9, wherein the case that the selectable transmitter state of the terminal is not unique comprises that:

before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

15. The method for determining the transmitter state according to claim 14, wherein, the transmitter state configuration information is configured to indicate the terminal to consider that the one-antenna-port uplink transmission is performed on at least one carrier on the first band, and the one-antenna-port uplink transmission is performed on the at least one carrier on the third band; or the transmitter state configuration information is configured to indicate the terminal to consider that the one-antenna-port uplink transmission is performed on at least one carrier on the second band, and the one-antenna-port uplink transmission is performed on the at least one carrier on the third band; or the transmitter state configuration information is configured to indicate the terminal to consider that two-antenna-port uplink transmission is performed on the at least one carrier on the third band.

16. A base station, comprising:

a transmitter configured to send transmitter state configuration information to a terminal, wherein a band on which one or more transmitter chains of the terminal perform uplink transmission is dynamically switched among more than two bands, and the transmitter state configuration information is configured to, in a case that a selectable transmitter state of the terminal is not unique after the band on which the one or more transmitter chains of the terminal perform the uplink transmission is switched, indicate a transmitter state of the terminal after the switching.

17. The base station according to claim 16, wherein the case that the selectable transmitter state of the terminal is not unique comprises that:

before the switching, two-antenna-port uplink transmission is supported on at least one carrier on a first band among the more than two bands by the terminal, and after the switching, no uplink transmission is performed by the terminal on any carrier on the first band, and one-antenna-port uplink transmission is performed by the terminal on at least one carrier on a second band among the more than two bands.

18. The base station according to claim 17, wherein the transmitter state configuration information is configured to indicate the terminal to consider that one-antenna-port uplink transmission is performed on the first band and the one-antenna-port uplink transmission is performed on the second band, or to indicate the terminal to consider that two-antenna-port uplink transmission is performed on the at least one carrier on the second band.

19. The base station according to claim 16, wherein the case that the selectable transmitter state of the terminal is not unique comprises that:

before the switching, one-antenna-port uplink transmission is performed by the terminal on at least one carrier on at least one of a first band and a second band among the more than two bands, and one-antenna-port uplink transmission is supported on both the first band and the second band by the terminal, and after the switching, no uplink transmission is performed by the terminal on the first band and no uplink transmission is performed by the terminal on the second band, and one-antenna-port uplink transmission is performed by the terminal on at least one carrier on a third band among the more than two bands.

20. The base station according to claim 19, wherein, the transmitter state configuration information is configured to indicate the terminal to consider that the one-antenna-port uplink transmission is performed on at least one carrier on the first band, and the one-antenna-port uplink transmission is performed on at least one carrier on the third band; or the transmitter state configuration information is configured to indicate the terminal to consider that the one-antenna-port uplink transmission is performed on at least one carrier on the second band, and the one-antenna-port uplink transmission is performed on at least one carrier on the third band; or the transmitter state configuration information is configured to indicate the terminal to consider that two-antenna-port uplink transmission is performed on at least one carrier on the third band.

* * * * *